United States Patent
Zhuravlev

(10) Patent No.: US 11,724,301 B1
(45) Date of Patent: Aug. 15, 2023

(54) EXPANDER OF TUBULAR ASSEMBLY

(71) Applicant: VAMMI S.r.l., Trento (IT)

(72) Inventor: Alexey Zhuravlev, Trento (IT)

( * ) Notice: Subject to any disclaimer, the term of this patent is extended or adjusted under 35 U.S.C. 154(b) by 0 days.

(21) Appl. No.: 17/808,225

(22) Filed: Jun. 22, 2022

(30) Foreign Application Priority Data

May 16, 2022 (IT) .......................... 102022000010013

(51) Int. Cl.
| | |
|---|---|
| *B21D 39/08* | (2006.01) |
| *B23P 11/00* | (2006.01) |
| *B23P 19/10* | (2006.01) |
| *B29C 63/34* | (2006.01) |
| *F16L 55/163* | (2006.01) |
| *F16L 55/18* | (2006.01) |

(52) U.S. Cl.
CPC ............ *B21D 39/08* (2013.01); *B23P 11/005* (2013.01); *B23P 19/107* (2013.01); *B29C 63/341* (2013.01); *F16L 55/163* (2013.01); *F16L 55/18* (2013.01); *Y10T 29/4978* (2015.01)

(58) Field of Classification Search
CPC ............. B29C 63/341; B29C 63/0047; B29C 2063/006; B29C 63/18; F16L 55/163; F16L 55/165; F16L 55/18; B21D 39/10–14; B21D 39/18; B24B 39/023; B23P 11/005; B23P 19/107; Y10T 29/4994; Y10T 29/4978
See application file for complete search history.

(56) References Cited

U.S. PATENT DOCUMENTS

| | | | | |
|---|---|---|---|---|
| 2,395,450 A | * | 2/1946 | Browning | ........... B29C 63/0047 |
| | | | | 118/118 |
| 2,430,273 A | | 11/1947 | Browning | |
| 4,773,450 A | | 9/1988 | Stanley | |

FOREIGN PATENT DOCUMENTS

| | | | | |
|---|---|---|---|---|
| CN | 114055770 A | * | 2/2022 | ........... B29C 63/341 |
| KR | 102076687 B1 | * | 2/2020 | ............ F16L 55/163 |
| SU | 1649208 A1 | * | 5/1991 | .............. F16L 55/18 |

OTHER PUBLICATIONS

Italian Patent and Trademark Office, Search Report, dated Dec. 2, 2022—Relevant portions are in English.

* cited by examiner

*Primary Examiner* — Matthew P Travers
(74) *Attorney, Agent, or Firm* — Themis Law

(57) ABSTRACT

An expander of a tubular assembly having a tubular covering element inserted into a tubular element includes a tip for pushing a first internal wall of the tubular covering element towards a second internal wall of the tubular element so as to enable the adhesion of a first external wall of the tubular covering element to the second internal wall. The expander includes a rotary joint sliding along a first longitudinal axis, to which the tip is coupled so as to arrange the tip radially and enable it to rotate around the first axis. The expander further includes a sensor operatively connected to the tip to detect a radial displacement of the tip owing to a current thrust exerted by the tip, and a logic control unit operatively connected to the sensor and the tip to adjust a future thrust as a function of the radial displacement.

8 Claims, 1 Drawing Sheet

EXPANDER OF TUBULAR ASSEMBLY

FIELD OF APPLICATION

The present invention is applicable to the technical field relating to the construction of tubes for conveying fluids and, in particular, has as its subject matter an expander of a tubular assembly.

BACKGROUND ART

It often occurs that, after long periods of use, the inner surface of tubes for conveying fluids is subject to wear and tear ad there is a subsequent need to replace them. However, it is known that in some situations it is not easy to completely replace the tubes, since the worn ones need to be disposed of.

For this reason, the known technique often employs special tubular covering elements in metal material with a slightly smaller diameter than the tubular element to be covered so that it fits easily into the latter. Once inserted, the tubular covering elements are deformed radially until they are compressed against the inner surface of the tube to be covered, and this is typically done by introducing a pressurised fluid inside the tubular covering element.

This technique, however, is particularly complex to apply and consequently costly if not, in some cases, unworkable.

Another technique involves the use of annular expanders or those with an end having a large thrust surface acting from inside the tubular assembly. The large dimensions of the above-mentioned expanders are justified by the fact that they must ensure adequate processing times, in other words, at least comparable to the times used with the pressurised fluid technique inside the tubular assembly.

However, it is known that the inner surface of the tubular element to be covered is not always perfectly linear and, therefore, with both of the techniques described above it often happens that air chambers are created between the two tubes. This occurs in particular because, with the expanders described above, it is not possible to reach the small cavities created due to wear and tear on the internal wall of the tubular element to be covered. Since the tubular covering element is typically made of soft materials in order to allow for radial deformation, it follows that, in the event of the formation of air chambers between the two tubular elements, considerable pressure differences between the inside and the outside of the tubular covering element could be created, which in turn could lead to the latter breaking and the consequent need for repair or replacement.

SUMMARY OF THE INVENTION

The purpose of the present invention is, at least partially, to overcome the drawbacks highlighted above by providing an expander of a tubular assembly which enables adhesion of the tubular covering element to the entire internal wall of the tubular element to be covered.

In particular, a subject matter of the present invention is to provide an expander of a tubular assembly that enables the tubular covering element to bond to the tubular element to be covered also at the cavities created on the latter.

It follows that, another subject matter of the present invention is to provide an expander of a tubular assembly that avoids the creation of air chambers between the two tubular elements.

It again follows that another subject matter of the present invention is to provide an expander of a tubular assembly which makes it possible to avoid the risk of breakage of the tubular covering element due to pressure differences between the inside and outside of the tubular covering element.

Yet another subject matter of the present invention is to provide an expander of a tubular assembly that saves the costs of replacing the tubular covering element due to breakage.

Still a further subject matter of the present invention is to provide an expander of a tubular assembly that enables the above to be achieved in a suitably rapid execution time compared to the known technique.

Said purposes, as well as others which will become clearer below, are achieved by an expander of a tubular assembly in accordance with the following claims, which are to be considered an integral part of the present patent.

In particular, the expander is applicable to a tubular assembly having at least one tubular covering element inserted within a tubular element to be covered. Such an expander comprises at least one tip shaped to push a first internal wall of the tubular covering element toward a second internal wall of the tubular covering element.

Advantageously, the presence of the tip makes it possible to follow more precisely, compared to the known technique, the course of the second internal wall of the tubular element to be covered.

It follows, again advantageously, that the foregoing enables the tubular covering element to expand more correctly at the cavities of the tubular element to be covered compared to the prior art.

This advantageously avoids the risk of air chambers forming between the two tubular elements.

According to another aspect of the invention, the expander comprises at least one rotary joint coupled to at least one motor that allows the rotary joint to slide according to a first axis coinciding with the longitudinal development axis of the tubular assembly and to rotate around the same axis.

According to a further aspect of the invention, the tip is coupled to the rotary joint in such a way that it is arranged radially with respect to the first axis.

Advantageously, coupling the tip to the rotary joint also allows the tip to be rotated around the first axis and moved along the tubular assembly.

Again advantageously, this allows the tip to reach the entire circumference of the first internal wall of the tubular covering element. This, together with the movement along the tubular assembly, causes the tip to follow a substantially helical path along the first internal wall of the tubular covering element.

It follows, advantageously, that the foregoing allows an integral adhesion of the external wall of the tubular covering element with the second internal wall of the tubular element to be covered.

According to another aspect of the invention, the expander comprises at least one sensor operatively attached to the tip to detect the radial displacement of the tip as a result of a current exerted thrust.

Advantageously, the presence of the sensor makes it possible to measure the radial displacement travelled by the tip due to the effect of the thrust exerted by the tip and thus, implicitly, to detect the development of the second internal wall of the tubular element to be covered.

Moreover, according to a further aspect of the invention, the expander comprises at least one logic control unit operatively connected at least to the sensor and at least to the tip to adjust the future thrust exerted by the tip as a function of at least the radial displacement.

Advantageously, the foregoing makes it possible to predict the next displacement to be made by the tip.

Again advantageously, this makes it possible to predict the thrust that will be required for the tip to reach the next displacement.

It follows, advantageously, that the logic unit in fact "tries to predict" the surface trend of the second internal wall of the tubular element to be covered, thus allowing for a more precise execution than in the known technique, albeit with a fast execution time.

According to another aspect of the invention, the logic control unit comprises at least one memory circuit.

Advantageously, the presence of the memory circuit makes it possible to store at least the radial displacement of the tip.

Moreover, the memory circuit is also configured to store a path taken by the expander along the first axis.

This again makes it advantageously possible to develop a historical record of the path taken by the expander.

It follows, again advantageously, that the foregoing makes it possible to store the longitudinal and radial displacements as well as the force used for the radial displacement of the tip and, therefore, to obtain a historical record of the course of the second internal wall of the tubular element to be covered.

Again advantageously, this increases the predictability of the future course of the second internal wall of the tubular element to be covered and thus the future force that will be required for the subsequent radial displacement of the tip.

From the above, it is evident that the above-mentioned aims and advantages are also achieved by a method of manufacturing a tubular assembly comprising the following steps:
(a) start the motor so that the joint slides along the first axis and rotates;
(b) detect, by means of the sensor, the radial displacement of the tip caused by the thrust currently being exerted by the tip;
(c) calculate the current thrust using the logic control unit;
(d) using the logic control unit, adjust the future thrust exerted by the tip as a function of at least the radial displacement.

BRIEF DESCRIPTION OF THE DRAWINGS

Further features and advantages of the invention will become more apparent in the light of the detailed disclosure of a preferred, but not exclusive, embodiment of an expander of a tubular assembly and a method of expanding a tubular assembly according to the invention, illustrated by way of example only with the aid of the accompanying drawings wherein.

DETAILED DISCLOSURE OF EMBODIMENTS OF THE INVENTION

Figure 1:
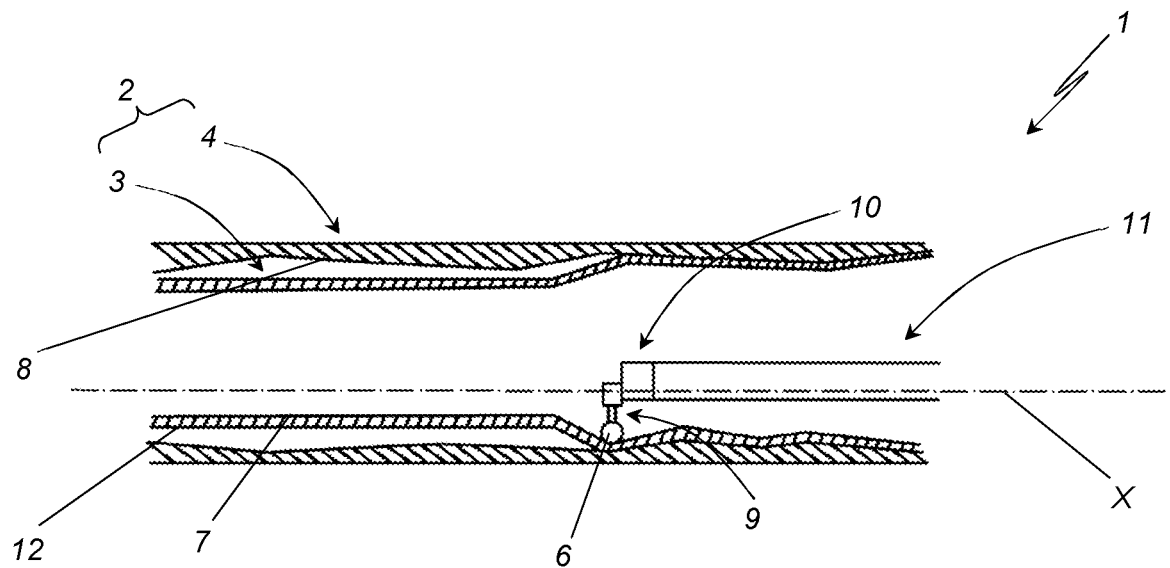
FIG. 1 represents an expander of a tubular assembly in an operational phase in a partially sectioned view.
Figure 2:
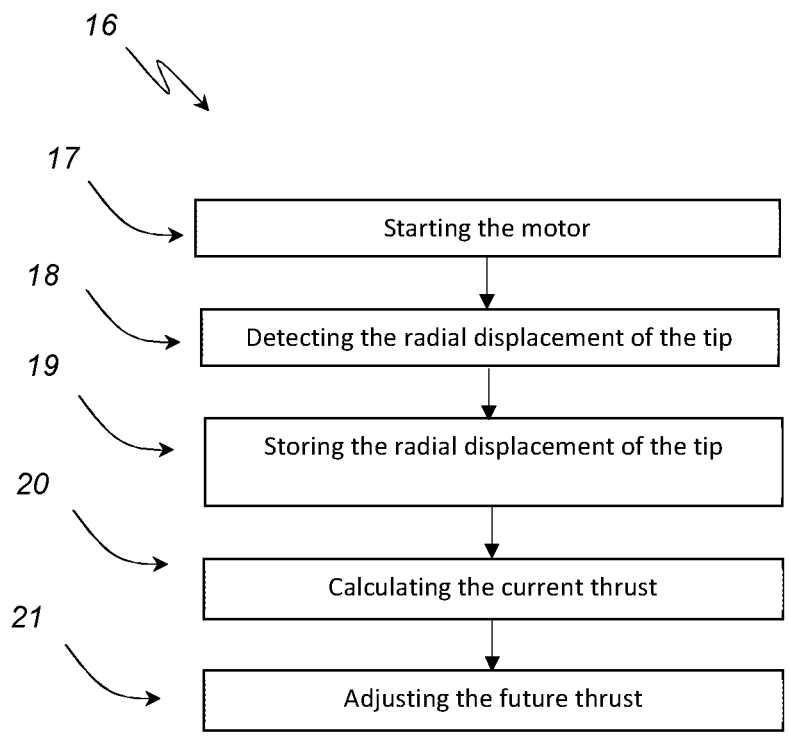
FIG. 2 represents a block diagram of the method for manufacturing a tubular assembly according to the invention.

With reference to the above-mentioned Figures, an expander 1 of a tubular assembly 2 is disclosed according to the invention.

In particular, the expander 1 is applicable to a tubular assembly 2 having a tubular covering element 3 inserted within a tubular element to be covered 4. Said expander 1 comprises a tip 6 shaped to push a first internal wall 7 of the tubular covering element 3 towards a second internal wall 8 of the tubular element to be covered 4. To this end, it is evident that the tip 6 is arranged radially with respect to the tubular assembly 2.

Advantageously, the presence of the tip 6 allows the course of the second internal wall 8 of the tubular element to be covered 4 to be monitored more precisely than in the known technique.

It follows, again advantageously, that the foregoing allows the tubular covering element 3 to be expanded more correctly at the cavities on the second internal wall 8 of the tubular element to be covered 4 than is the case with the known technique.

Advantageously, this makes it possible to avoid the risk of formation of air chambers between the two tubular elements 3 and 4, significantly reducing, if not zeroing, the possibility of generating pressure differences between the inside and the outside of the tubular covering element 3.

It follows, still advantageously, that the presence of the tip 6 allows reduction, if not avoidance altogether, of the risk of breakage of the tubular covering element 3.

Advantageously, therefore, this makes the tubular assembly 2 more resistant and durable, resulting in considerable cost savings.

Obviously, the originator of the radial movement of the tip 6 is a pusher 9 which, according to another aspect of the invention, is interposed between the tip 6 and a rotary joint 10 which will be discussed below. Clearly, this feature is not to be regarded as limiting for different embodiments of the invention according to which the pusher is placed differently or the expander comprises different pushing elements.

Obviously, as regards the presence of the tip 6, it should be specified that this feature should also not be considered limiting for different embodiments of the invention according to which there are two or more tips. The same applies to the conformation of the tip 6, which can be of any shape without any limitation for the present invention.

According to another aspect of the invention, the expander 1 comprises, as mentioned above, a rotary joint 10 coupled to at least one motor 11 which makes it possible to slide the rotary joint 10 according to a first axis X coinciding with the longitudinal development axis of the tubular assembly 2 and to rotate it around the same first axis X.

Moreover, according to a further aspect of the invention, the tip 6 is coupled to the rotary joint 10 in such a way that it is arranged radially with respect to the first axis X.

Advantageously, the coupling of the tip 6 to the rotary joint 10 also allows the tip 6 to be rotated about the first axis X.

Again advantageously, this allows the tip 6 to reach the entire first internal wall 7 of the tubular covering element 3.

It follows, advantageously, that the foregoing makes possible an integral adhesion of the external wall 12 of the tubular covering element 3 with the second internal wall 8 of the tubular element to be covered 4.

According to another aspect of the invention, although not shown in the Figures the expander 1 comprises a sensor operatively connected to the tip 6 to detect the radial displacement thereof following a current thrust exerted.

Advantageously, the presence of the sensor makes it possible to measure the displacement in the radial direction travelled by the tip 6 due to the effect of the thrust exerted by the same and, therefore, implicitly, to detect the development of the second internal wall 8 of the tubular element to be covered.

According to yet a further aspect of the invention, the expander 1 comprises a logic control unit, also not shown in the Figures, operatively connected to the sensor and to the tip 6 to adjust the future thrust exerted by the tip 6 as a function of radial displacement.

Advantageously, the foregoing makes it possible to predict the next displacement to be made by the tip 6.

Again advantageously, this makes it possible to predict the thrust that will be required for the tip 6 to reach the next displacement.

It follows, advantageously, that the logic unit makes it possible to obtain a more precise execution than in the known technique, albeit with a fast execution time.

According to another aspect of the invention, the logic control unit comprises a memory circuit not shown in the Figures.

Advantageously, the presence of the memory circuit makes it possible to store the radial displacement of the tip 6.

Moreover, the memory circuit is also configured to store a path taken by the expander 1 along the first axis X.

This makes it advantageously possible to develop a historical record of the path taken by the expander 1.

It follows, again advantageously, that the foregoing makes it possible to store the displacements as well as the force used for the radial displacement of the tip 6 and, therefore, to obtain a historical record of the course of the second internal wall 8 of the tubular element to be covered 4.

Again advantageously, this increases the predictability of the future course of the second internal wall 8 of the tubular element to be covered 4 and thus the future force that will be required for the subsequent radial displacement of the tip 6.

Obviously, for this purpose the expander 1 of the invention also comprises a computer product such as a processor.

Operationally, the tubular assembly 2 is manufactured through a method 16 which comprises a first start-up step 17 of the motor 11.

As mentioned, the motor 11 makes it advantageously possible to slide the rotary joint 10 along the first axis X and to rotate it inside the tubular assembly 2.

Moreover, as mentioned above, the tip 6 is coupled to the rotary joint 10. It follows that, again advantageously, the motor 11 also makes it possible to rotate the tip 6 which, therefore, being arranged radially with respect to the first axis X, reaches the entire internal circumference of the tubular element to be covered 4.

According to an aspect of the invention, the method 16 comprises a step of detecting 18, by means of the sensor, the radial displacement of the tip 6 following the current thrust exerted by the tip 6 itself.

Advantageously, during this phase the sensor makes it possible to measure the displacement in the radial direction of the tip 6 following the current thrust exerted by the same.

Subsequently, the method 16 comprises a step of calculating 19 the current thrust, carried out by the logic control unit.

Advantageously, the above makes it possible to understand the distance between the external wall 12 of the tubular covering element 3 and the second internal wall 8 of the tubular element to be covered 4.

Again advantageously, this makes it possible to detect the possible presence of cavities on the second internal wall 8 of the tubular element to be covered 4.

Moreover, according to another aspect of the invention, after the calculation step 19, the method 16 comprises a step of adjusting 20, again by means of the logic control unit, the future thrust exerted by the tip 6 as a function of the radial displacement.

In other words, during the adjustment step 20, the logic control unit adapts the future thrust of the tip 6 as a function of the radial displacement. More specifically, if the radial displacement following the current thrust is greater than a previous radial displacement with the same thrust, it means that the expander 1 is in the vicinity of a cavity or, at any rate, of an enlargement of the second internal wall 8 of the tubular element to be covered 4. It follows that, since, by nature, a cavity begins with a descent and then ascends once the lowest point has been reached, the sensor makes it possible to detect implicitly the presence of a cavity, and the logic control unit, advantageously, makes it possible to exert a greater future thrust so as to enable the future radial displacement of the tip 6 that will be necessary to follow the course of the cavity present on the second internal wall 8 of the tubular element to be covered 4.

This again makes it advantageously possible to obtain greater precision in the expansion of the tubular covering element 3.

Again advantageously, this makes it possible to avoid the risk of creating air chambers between the tubular covering element 3 and the tubular element to be covered 4.

It follows, advantageously, that the foregoing makes it possible to reduce or avoid altogether the risk of breakage of the tubular covering element 3 caused by pressure differences between the inside and the outside thereof.

Again, this saves the time and costs of early replacement and/or maintenance of the tubular covering element 3.

Not only that, but it also makes it possible, again advantageously, to create a durable tubular assembly 2.

In addition, the prediction of the development of the second internal wall 8 makes it possible to optimise the tip 6 pushing phase, thereby optimising expansion execution times.

According to a further aspect of the invention, the method 16 comprises a step of storing 21 the tip 6 radial displacement in the memory circuit.

Moreover, as mentioned above, the memory circuit is also configured to store a path taken by the expander 1 along the first axis X.

This makes it advantageously possible to develop a historical record of the path taken by the expander 1.

It follows, again advantageously, that the foregoing makes it possible to store the displacements as well as the force used for the radial displacement of the tip 6 and, therefore, to obtain a historical record of the course of the second internal wall 8 of the tubular element to be covered 4.

Again advantageously, this increases the predictability of the future course of the second internal wall 8 of the tubular element to be covered 4 and thus the future force that will be required for the subsequent radial displacement of the tip 6.

In this way, advantageously, further considerable time saving is made possible in the execution of the method 16 of manufacturing the tubular assembly 2.

In light of the foregoing, it is evident that the expander of a tubular assembly of the invention achieves all of its intended purposes.

In particular, the expander of the invention allows the adhesion of the tubular covering element to the entire internal wall of the tubular element to be covered.

Indeed, it makes it possible to adhere the tubular covering element to the tubular element to be covered also at the cavities created on the latter.

It follows that the expander of a tubular assembly makes it possible to avoid the creation of air chambers between the two tubular elements.

Accordingly, it makes it possible to avoid the risk of breakage of the tubular covering element due to pressure differences between the inside and the outside of the tubular covering element.

Moreover, the expander of a tubular assembly of the invention makes it possible to save the costs of replacing the tubular covering element due to breakage of the same.

Furthermore, it enables the above to be achieved in a suitably quick turnaround time compared to the known technique.

The invention might be subject to many changes and variants, which are all included in the appended claims. Moreover, all the details may furthermore be replaced by other technically equivalent elements, and the materials may be different depending on the needs, without departing from the protection scope of the invention defined by the appended claims.

The invention claimed is:

1. An expander for expanding a tubular assembly having a tubular covering element inserted inside a tubular element to be covered, the expander comprising:
    a tip shaped to push a first internal wall of the tubular covering element toward a second internal wall of the tubular element to be covered so as to enable adhesion of a first external wall of the tubular covering element to the second internal wall of the tubular element to be covered;
    a rotary joint slidable along a longitudinal first axis of the tubular assembly, the tip being coupled to the rotary joint so as to arrange the tip radially with respect to the first axis and to enable the tip to rotate around the first axis;
    a motor coupled to the rotary joint and causing the rotary joint to slide along the first axis and to rotate;
    a sensor operatively connected to the tip at least to detect a radial displacement of the tip following a current thrust exerted by the tip; and
    a logic control unit operatively connected to the sensor and to the tip for adjusting a future thrust exerted by the tip according to the radial displacement.

2. The expander according to claim 1, further comprising a pusher interposed between the tip and the rotary joint.

3. The expander according to claim 1, further comprising a memory circuit connected to the logic control unit so as to memorize at least the radial displacement of the tip.

4. The expander according to claim 3, wherein the memory circuit is configured to also memorize a travelled path followed by the expander along the first axis.

5. The expander according to claim 4, further comprising a processor configured to calculate the future thrust also based on the traveled path.

6. The expander according to claim 5, wherein the processor is further configured to calculate the future thrust as a function of at least a plurality of radial displacements stored in the memory circuit.

7. A method of manufacturing a tubular assembly using the expander according to claim 3, comprising the following steps:
    starting the motor so as to cause the rotary joint to slide along the first axis and to rotate;
    detecting, with the sensor, the radial displacement of the tip following the current thrust exerted by the tip;
    calculating, with the logic control unit, the current thrust; and
    adjusting, with the logic control unit, the future thrust exerted by the tip as a function of at least the radial displacement.

8. The method according to claim 7, further comprising a step of storing, in the memory circuit, at least the radial displacement of the tip.

* * * * *